United States Patent [19]

Hibino et al.

[11] Patent Number: 4,719,820

[45] Date of Patent: Jan. 19, 1988

[54] METHOD FOR DIRECTING A DOWN-SHIFT OPERATION FOR A VEHICLE WITH A MANUAL TRANSMISSION

[75] Inventors: Yoshitaka Hibino, Ustunomiya; Hiroshi Kogure, Tokorozawa, both of Japan

[73] Assignee: Honda Giken Kogyo Kabushiki Kaisha, Tokyo, Japan

[21] Appl. No.: 780,287

[22] Filed: Sep. 26, 1985

[30] Foreign Application Priority Data

Sep. 28, 1984 [JP] Japan ................................ 59-203280

[51] Int. Cl.⁴ ............................................. B60K 41/04
[52] U.S. Cl. .......................................... 74/866; 74/865
[58] Field of Search .................. 74/866, DIG. 7, 856, 74/858, 863, 865; 364/424.1; 340/52 R, 52 F

[56] References Cited

U.S. PATENT DOCUMENTS

| | | | |
|---|---|---|---|
| 4,354,173 | 10/1982 | Kuhn et al. | 340/52 R X |
| 4,425,620 | 1/1984 | Batcheller et al. | 364/424.1 |
| 4,438,423 | 3/1984 | Stier | 340/52 R |
| 4,463,427 | 7/1984 | Bonnetain et al. | 364/424.1 X |
| 4,517,646 | 5/1985 | Magnusson et al. | 74/866 X |
| 4,539,868 | 9/1985 | Habu | 364/424.1 X |
| 4,544,909 | 10/1985 | Di Nunzio | 340/52 R |
| 4,555,691 | 11/1985 | Hosaka et al. | 340/52 R |
| 4,559,599 | 12/1985 | Habu et al. | 364/424.1 |
| 4,564,906 | 1/1986 | Stephan et al. | 364/424.1 |

FOREIGN PATENT DOCUMENTS 5751526  9/1980  Japan .

Primary Examiner—Leslie A. Braun
Assistant Examiner—David Novais
Attorney, Agent, or Firm—Birch, Stewart, Kolasch & Birch

[57] ABSTRACT

A method for indicating a running condition of a vehicle having an engine and a manual transmission generates a direction of a down-shift operation according to a detected opening angle of a throttle valve of the engine and detected acceleration and deceleration of the vehicle. The direction of the down-shift operation is generated when the acceleration of the vehicle is above a predetermined value while the throttle valve is substantially fully closed and when the deceleration of the vehicle is above a predetermined value while the throttle valve is substantially fully opened. Thus, a suitable direction of gear position is generated when the vehicle is climbing an uphill road or coasting on a downhill road.

3 Claims, 3 Drawing Figures

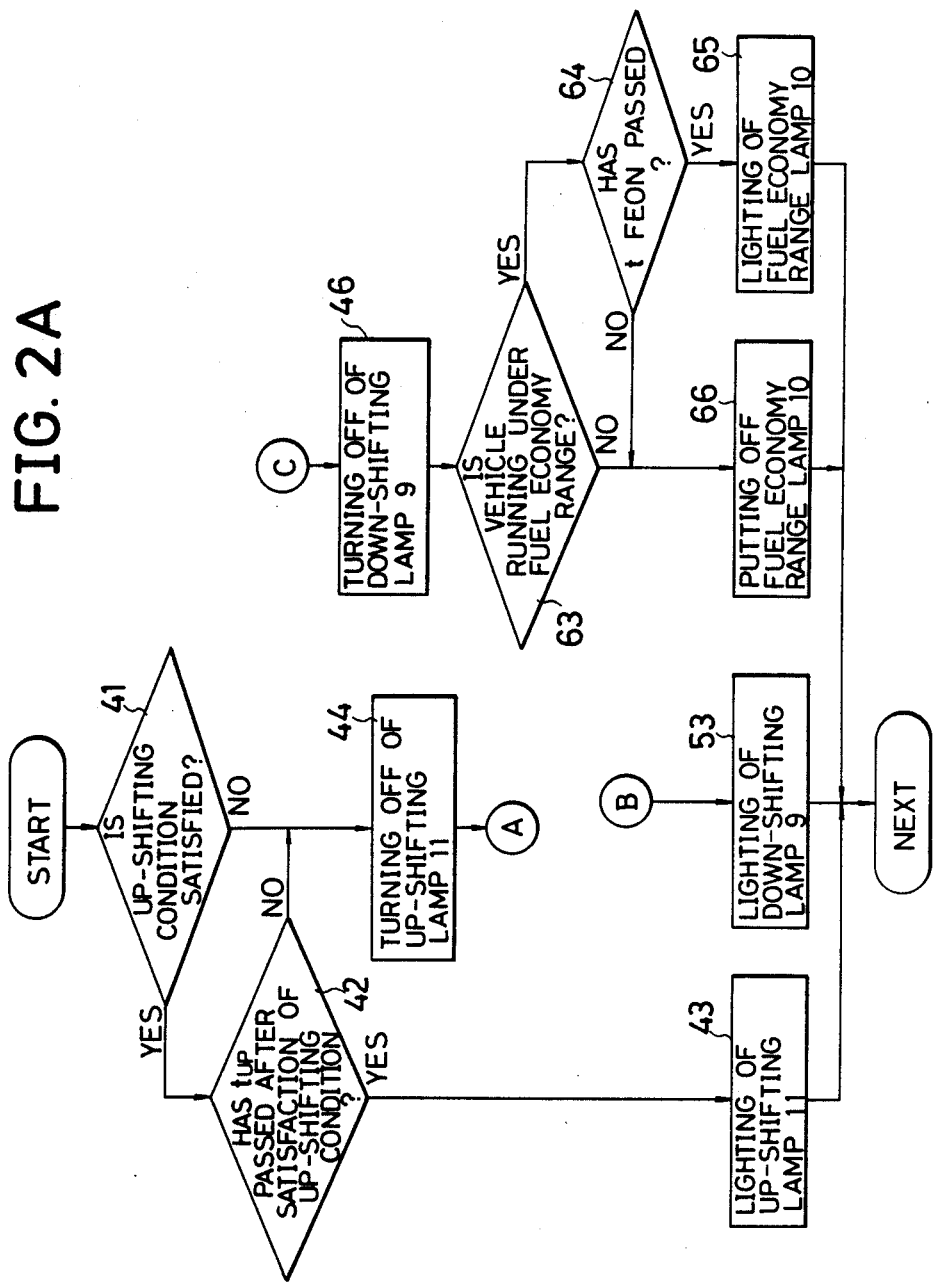

METHOD FOR DIRECTING A DOWN-SHIFT OPERATION FOR A VEHICLE WITH A MANUAL TRANSMISSION

BACKGROUND OF THE INVENTION

1. Field of the Invention

The present invention relates to a method for directing a down-shift operation for a vehicle with a manual transmission, or in other words, for indicating that the vehicle is running under a condition in which a downshifting of the manual transmission is needed.

2. Description of Background Information

For vehicles having a manual transmission, various techniques for indicating an appropriate gear position have been proposed so as to promote fuel savings. For instance, Japanese Patent application laid open No. 57-51526 discloses a technique in which an economic range of vehicle running condition is derived from the acceleration or the deceleration of the vehicle which is detected by differentiating a detected value of the vehicle speed. The thus derived economic range is then displayed on a display means in order to send a signal to a driver of the vehicle so that the driver can select the most economic gear position.

However, in the case of the above mentioned conventional technique, there are some problems which occur when the vehicle decelerates during climbing a gradient with the throttle valve fully opened, and when the vehicle accelerates during running on a downhill road with the throttle valve fully closed. Under these conditions, it is very likely to misjudge that the vehicle operation is in the fuel economy range and it fails to indicate the necessary down-shift direction to the driver. Thus the driveability may be lessened when the vehicle is running on an uphill road or a downhill road.

OBJECT AND SUMMARY OF THE INVENTION

An object of the present invention is therefore to provide a method for directing a down-shift operation to the driver which is adapted to prevent the lessening of the driveability of the vehicle when the vehicle is running on an uphill road or on a down hill road.

According to the present invention, a method for directing a timing of down-shift is characterized in that a down-shift signal is produced when the acceleration of the vehicle while the throttle valve is fully closed becomes greater than a first predetermined reference and when the deceleration of the vehicle while the throttle valve is fully open becomes greater than a second predetermined reference.

BRIEF DESCRIPTION OF THE DRAWINGS

FIGS. 2A and 2B, when combined, are a flowchart showing steps of an embodiment of the down-shift indication method according to the present invention.

DETAILED DESCRIPTION OF PREFERRED EMBODIMENTS

Figure 1:
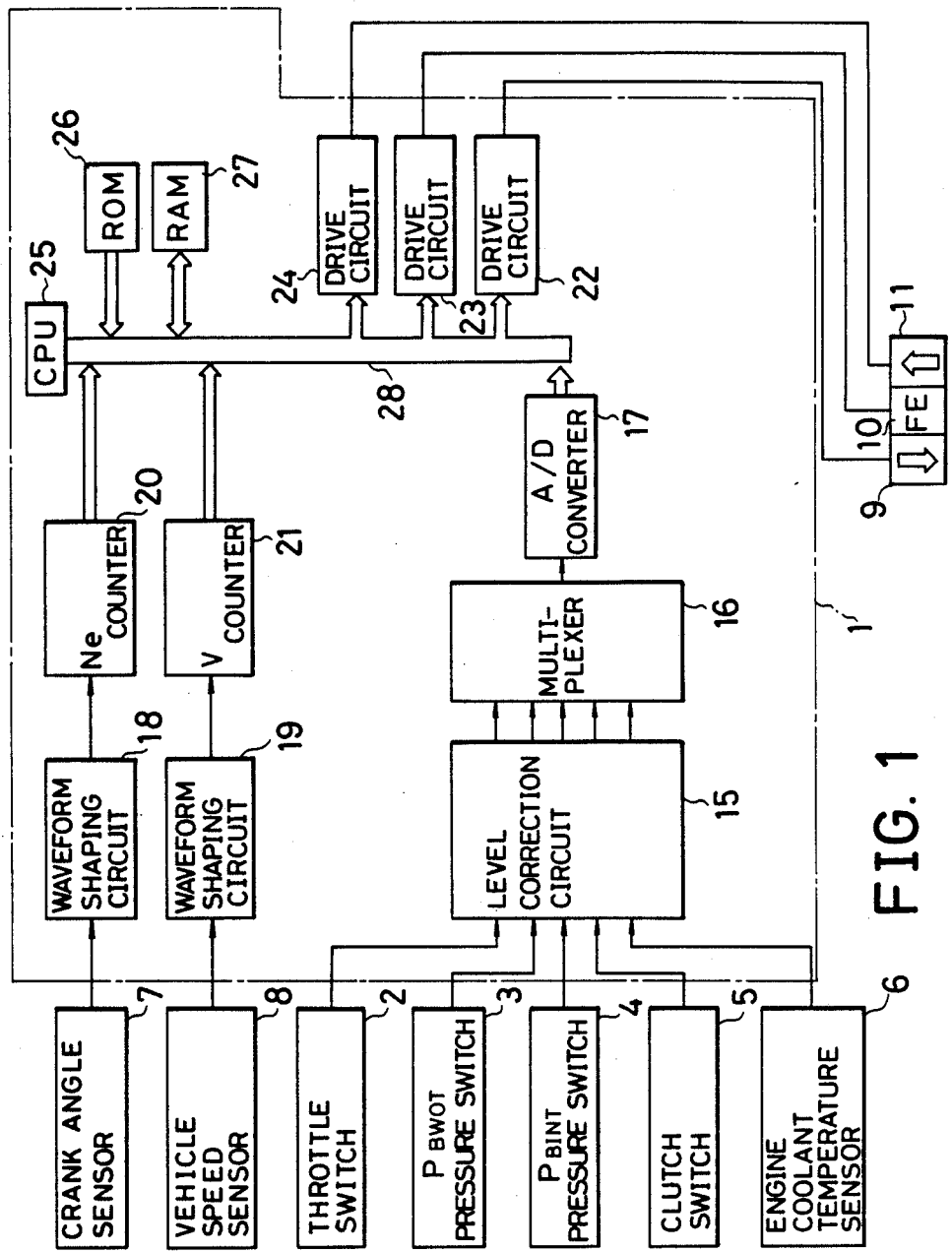
FIG. 1 is a block diagram of a system for indicating running conditions of the vehicle, in which the downshift indication method according to the present invention is suitably applied.

Reference is first made to FIG. 1, showing a device for indicating running states of the vehicle in which the method for directing the timing of down-shift according to the present invention is applied. This running states indication device includes a control circuit 1 which comprises a microcomputer. The control circuit 1 receives various sensor output signals, namely from a throttle switch 2, pressure switches 3 and 4, a clutch switch 5, an engine coolant temperature sensor 6, a crank angle sensor 7, and a vehicle speed sensor 8. Lamps 9 through 11 are also connected to the control circuit 1. The valve of an internal combustion engine is closed. The pressure switch 3 turns on when a pressure $P_B$ in an intake manifold downstream of the throttle valve is equal to or greater than a predetermined level $P_{BWOT}$ ($-85$ mmHg for example), and the pressure switch 4 turns on when the pressure $P_B$ in the intake manifold downstream of the throttle valve is equal to or greater than another predetermined level $P_{BINT}$ ($-370$ mmHg for example). The clutch switch 5 turns on when a clutch is disengaged to interrupt the transmission of engine power. These switches 2 through 5 produce a predetermined voltage when activated. The engine coolant temperature sensor 6 produces an output signal whose level varies with the temperature of the engine coolant. The crank angle sensor 7 generates an angular position signal whose period is inversely proportional to the rotational speed of the engine crankshaft. Similarly, the vehicle speed sensor 8 produces an angular position signal whose period is inversely proportional to the rotational speed of an output shaft of the manual transmission. The lamp 9 is provided to indicate that the vehicle is running under a condition in which a downshift of the manual transmission is required. On the other hand, the lamp 10 indicates that the vehicle is running under the fuel saving condition. In addition, the lamp 11 indicates that the vehicle is running under a condition in which an up-shift of the manual transmission is required.

The control circuit 1 includes a level correction circuit 15 for correcting levels of signals from the throttle switch 2, the pressure switches 3 and 4, the clutch switch 5, and the engine coolant temperature sensor 6. Output signals of the level correction circuit 15 are then supplied to a multiplexer 16 which selectively transmits one of output signals of the switches 2 through 5 and the sensor 6 supplied through the level correction circuit 15. An analog output signal of the multiplexer 16 is in turn supplied to an A/D (analog to digital) converter 17 for converting the analog signal from the mutiplexer 16 to a digital signal. The control circuit 1 further includes waveform shaping circuits 18 and 19 respectively for shaping the waveform of the angular position signals from the crank angle sensor 7 and the vehicle speed sensor 8 to square wave pulse signals. An output pulse signal of the waveform shaping circuit 18 is in turn supplied to an $N_e$ counter 20 for measuring intervals of pulses of the output signal of the waveform shaping circuit 18 by counting the number of predetermined clock pulses and producing a digital signal indicative of a value inversely proportional to the rotational speed of the engine. On the other hand, an output signal of the waveform shaping circuit 19 is supplied to a V counter 21 which measures intervals of output pulses of the waveform shaping circuit 19 by counting the number of predetermined clock pulses and producing a digital signal indicative of a value inversely proportional to the vehicle speed. The control circuit 1 further includes drive circuits 22 through 24 for driving the lamps 9 through 11, and a CPU (central processing unit) 25 and a ROM 26 for storing various programs and data, and a RAM 27. The A/D converter 17, the counters 20, 21, the drive circuits 22 through 24, the CPU 25, the ROM 26, and the RAM 27 is mutually connected via an I/O (input/output) bus 28.

In the thus constructed device, information as to the opening and closing of the throttle valve, the pressure $P_B$ in the intake manifold, the engagement or disengagement of the clutch, and the temperature of the engine coolant is selectively supplied to the CPU 25 through the I/O bus 28. Also, information of the engine speed $N_e$ and the vehicle speed V from the $N_e$ counter and the V counter 21 are supplied to the CPU 25 via the I/O bus 28.

The CPU 25 reads in the above mentioned various information according to a program stored in the ROM 26 and determines whether the up-shift is necessary, or whether the down-shift is necessary, and whether the vehicle is running under the condition of fuel economy, on the basis of these information. When the necessity of up-shift is determined by the CPU 25, a lamp drive command signal is supplied to the drive circuit 24. On the other hand, when the down-shift is determined to be necessary, a lamp drive command signal is supplied to the drive circuit 22. In addition, when the operation of the vehicle is determined to be under the fuel economy range, the lamp drive command signal is supplied to the drive circuit 22.

Figure 2B:
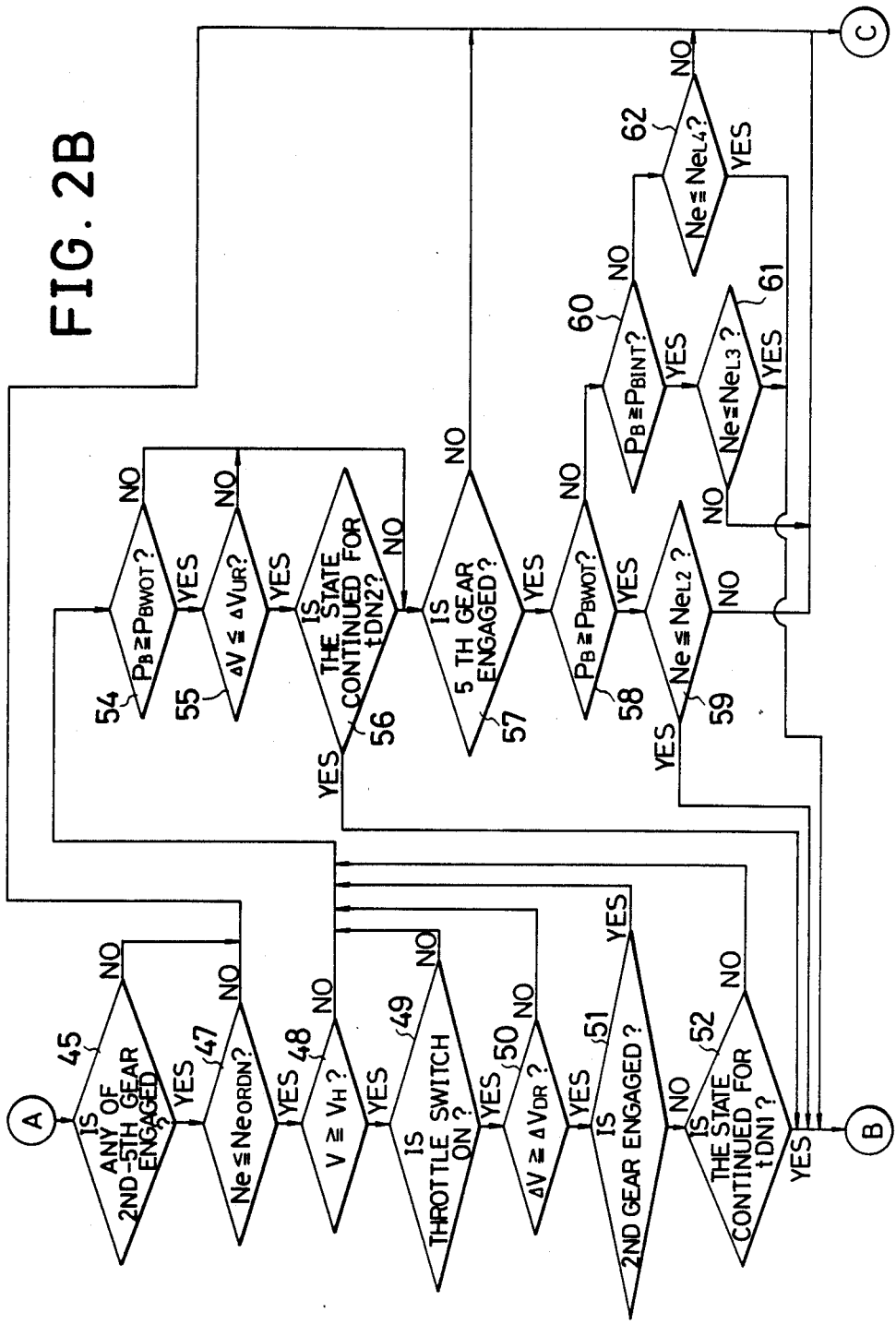

Referring now to the flowchart of FIGS. 2A and 2B, the operational sequence of the directing of the timing of down-shift according to the present invention will be explained hereinafter.

In this sequence of operations, whether or not the vehicle is operating under a condition allowing the up-shifting is determined at a step 41 firstly. If the vehicle is operating under a condition permitting the up-shifting, whether or not a predetermined time period $t_{up}$ has passed after the satisfaction of that condition is detected at a step 42, when the predetermined time period has passed, the lamp drive command signal is supplied to the drive circuit 24 so that the lamp 11 for indicating the necessity of the up-shift turns on, at a step 43. When the predetermined time period $t_{up}$ has not yet passed after the satisfaction of that condition, a lamp drive stop command signal is supplied to the drive circuit 24 so as to prevent an instantaneous light up of of the lamp 11, and the lamp 11 is turned off, at a step 44. When the up-shift condition is not satisfied at the step 41, the program also goes to the step 44 so that the lamp 11 is turned off.

Next, whether or not the currently engaged gear position is one of the second gear through the fifth gear is detected at a step 45. This step 45 is necessary because the down-shift is not possible when the first gear is engaged and any of the first to fifth gears can be selected when the gear is in the neutral position. If the result is "no" at the step 45, a lamp drive stop command is supplied to the drive circuit 22 so that the lamp 9 for directing the down-shift is turned off at a step 46. If engagement of one of the second through fifth gears is detected at the step 45, whether or not the engine rotational speed $N_e$ is equal to or smaller than a predetermined value $N_{eORDN}$ (3000 r.p.m.) is detected at a step 47. If $N_e > N_{eORDN}$, the program goes to the step 46 to stop the drive of the lamp 9 so as to prevent the down-shift that might cause engine over-revolution. If $N_e \leq N_{eORDN}$, whether or not the vehicle speed V is equal to or greater than a predetermined speed $V_H$ (35 Km/h for example) is detected at a step 48. If $V \geq V_H$, whether or not the throttle switch 2 is closed is detected at a step 49. On the assumption that the driver does not intend to raise the vehicle speed if the throttle switch 2 is closed, that is, the throttle valve is fully closed, whether or not the speed of variation $\Delta V$ of the vehicle speed V is equal to or greater than a reference speed variation $\Delta V_{DR}$ (1.0 Km/h/sec² for example) for detecting the acceleration is detected at a step 50. If $\Delta V \geq \Delta V_{DR}$, it is regarded that the gradient of the road (downhill road) is more steep relative to the braking force of the engine brake with the currently engaged gear position. This is because in this state the vehicle speed is increasing at a rate not less than $\Delta V_{DR}$ while the traction resistance is relatively large since the throttle valve is fully closed and the vehicle speed is above $V_H$. Accordingly, whether or not the currently engaged gear is the second gear is detected at a step 51. If the second gear is not engaged, whether or not that state has been continued for more than a predetermined time period $t_{DN1}$ is detected at a step 52. If that state has been continued for more than the predetermined time period $t_{DN1}$, a lamp driving command signal is supplied to the drive circuit 22 and the lamp 9 for directing the down-shift is lit at a step 53. In addition, the fully closed state of the throttle valve mentioned here means a state of the throttle valve when the accelerator pedal is not depressed.

If on the other hand $V < V_H$ at the step 48, it means that the vehicle speed is low and the accuracy of detection of the acceleration through the output pulses of the vehicle speed sensor is not high enough and an excessive use of the foot brake of the vehicle is not likely to occur. When $V < VH$ at the step 48, the throttle switch is off at the step 49, $\Delta V < \Delta V_{DR}$ at the step 50, the second gear is engaged at the step 51, or when the predetermined time period $t_{DN1}$ has not passed at the step 52, program goes to a step 54 in which whether or not the pressure $P_B$ in the intake passage is equal to or greater than the predetermined level $P_{BWOT}$ (on atmospheric pressure side) is detected. If $P_B \geq P_{BWOT}$, it means that the throttle valve is fully opened and it is assumed that the driver intends to maintain the vehicle speed or accelerate the vehicle. Then whether or not the speed of variation $\Delta V$ of the vehicle speed V is smaller than a reference speed variation $\Delta V_{UR}$ (−0.8 Km/h/sec² for example) for detecting the deceleration is detected at a step 55. When the $\Delta V \leq \Delta V_{UR}$, it is regarded that the running of the vehicle at a constant speed is not possible due to the gradient of the road althrough throttle valve is fully opened. Whether or not this condition is continued for more than a predetermined time period $t_{DN2}$ is detected at a step 56. If the predetermined time period $t_{DN2}$ has already passed, the operation of the step 53 will be performed so that the lamp 9 for directing the down-shift is lit up.

If, on the other hand, both of the conditions $P_B \geq P_{BWOT}$ and $\Delta V \leq \Delta V_{UR}$ are not satisfied and the above mentioned state has not lasted for more than the predetermined time period $t_{DN2}$, whether or not the fifth gear is engaged is detected at a step 57. If the fifth gear is not engaged, the lighting of the lamp 9 is stopped. If, on the other hand, the fifth gear is engaged, whether or not the pressure $P_B$ in the intake pipe is equal to or greater than the predetermined value $P_{BWOT}$ is detected at a step 58. If $P_B \geq P_{BWOT}$, whether or not the engine rotational speed $N_e$ is equal to or smaller than a predetermined rotational speed $N_{eL2}$ (850 r.p.m. for example) is detected at a step 59. If $N_e \leq N_{eL2}$, the operation of the step 53 is performed to light up the lamp 9 for directing the down-shift. If, on the other hand, $N_e > N_{eL2}$, the operation of the step 46 is performed to turn off the lamp 9 for directing the down-shift. If $P_B < P_{BWOT}$ at the step 58, whether or not the pressure $P_B$ is equal to or greater than a predetermined pressure value $P_{BINT}$ which is on the vaccum side from $P_{BWOT}$ is detected at a step 60. If $P_B \geqq P_{BINT}$ (on the side of atmospheric air), whether or not the engine rotational speed $N_e$ is equal to or higher than a predetermined speed $N_{eL3}$ (750 r.p.m. for example) which is lower than the predetermined speed $N_{eL2}$ is detected at a step 61. If, on the other hand, $P_B < P_{BINT}$, whether or not the engine rotational speed $N_e$ is equal to or higher than a predetermined speed $N_{eL4}$ (450 r.p.m. for example) which is lower than the predetermined speed $N_{eL3}$ is detected at a step 62. If $N_e \leqq N_{eL3}$ under the condition that $P_{BWOT} > P_B \geqq P_{BINT}$, the step 53 is performed to light up the lamp 9 for directing the down-shift. If $N_e > N_{eL3}$ the lamp 9 is turned off at a step 46. If $N_e \leqq N_{eL4}$ under the condition of $P_B < P_{BINT}$, the step 53 is performed to turn on the lamp 9 for directing the down-shift. If, on the other hand, $N_e > N_{eL4}$, the step 46 is performed to turn off the lamp 9. Under this condition, a state of the engine operation in which the engine speed is low and the high load is applied is detected and the signal of the shift-down is made relatively earlier because the driveability of the engine and/or the durability of the engine and the power train may be negatively affected. In addition, the "fully opened state of the throttle valve" referred to in this specification means a state in which the opening angle of the throttle valve is greater than a predetermined value, generally, stand for a state in which the accereation pedal is depressed completely.

When the lamp 9 for directing the down-shift is turned off in this manner, whether or not the engine is operating under the fuel economy range will be detected at the step 63. If the engine is operating under the fuel economy range, whether or not a predetermined time tFEON has passed after the engine operation entered to the economic range is detected at a step 64. If the predetermined time tFEON has already passed, the lamp drive command signal is supplied to the drive circuit 23 so as to turn on the lamp 23 for indicating (directing to entrance) the fuel economy range at a step 65. If the predetermined time tFEON has not passed, a lamp drive stop command signal is supplied to the drive circuit 23 so as to prevent the lighting up of the lamp 10 for a short instant and the lighting of the lamp 10 is stopped at a step 66. Also, the step 66 is performed when the engine operation under the fuel economy range is not detected at the step 63 and the lamp 10 is turned off.

It will be appreciated from the foregoing, in the case of the method for indicating the down-shift according to the present invention, the direction or command of the down-shift is generated under a state where the throttle valve is fully closed and the acceleration of the vehicle is greater than a pedetermined first reference value. Therefore, engine brake is applied by a suitable operation of the driver so that the driveability of the vehicle is improved. On the other hand, the down-shift command is also generated when the vehicle is running with the fully opended throttle valve and the deceleration of the vehicle is greater than a second predetermined reference value. Therefore, a higher driving force is obtained during climbing up of an up-hill road and it becomes possible to climb up the road at a constant speed.

What is claimed is:

1. A method for directing a timing of down-shift operation for a vehicle having an internal combustion engine and a manual transmission, comprising steps of:
   detecting an opening angle of a throttle valve of said internal combustion engine;
   detecting an acceleration and a deceleration of a vehicle; and
   generating a direction comprising a signal indicating a down-shift operation when the acceleration of the vehicle is above a predetermined first reference value while the vehicle is running with the throttle valve substantially fully closed and when the deceleration of the vehicle is above a predetermined second reference value while the vehicle is running with the throttle valve substantially fully opened.

2. A method as set forth in claim 1, wherein said direction of the down-shift operation is generated when the acceleration of the vehicle is above the first predetermined value while the vehicle is running with the throttle valve substantially fully closed and a vehicle speed is above a predetermined level.

3. A method for directing a timing of down-shift operation for a vehicle having an internal combustion engine and a manual transmission, comprising steps of:
   detecting an opening angle of a throttle valve of said internal combustion engine;
   detecting an acceleration and a deceleration of a vehicle;
   generating a direction of the down-shift operation when the acceleration of the vehicle is above a predetermined first reference value while the vehicle is running with the throttle valve substantially fully closed and when the deceleration of the vehicle is above a predetermined second reference value while the vehicle is running with the throttle valve substantially fully opened; and
   wherein said direction of the down-shift operation is generated when the deceleration of the vehicle is above the second predetermined value while the vehicle is running with the throttle valve substantially fully opened and a pressure within an intake pipe of said internal combustion engine downstream from said throttle valve is above a predetermined valve indicative of a high load condition of the engine.

* * * * *